2,960,554

ISOMERIZATION PROCESS

Joseph M. Sandri and Ellis K. Fields, Chicago, Ill., assignors to Standard Oil Company, Chicago, Ill., a corporation of Indiana No Drawing. Filed Mar. 26, 1959, Ser. No. 802,022

8 Claims. (Cl. 260—683.68)

This invention relates to the production of isoparaffins such as isobutane, isopentane and isohexanes by the treatment of the corresponding normal paraffins.

It is an object of the invention to produce isoparaffins from the corresponding normal paraffins. Another object of the invention is a process for the preparation of isoparaffins from the corresponding normal paraffins utilizing a solid catalyst for vapor phase contacting of the feedstock. A particular object is the process of preparing isobutane and/or isopentane and/or isohexanes from the corresponding normal paraffins utilizing a solid catalyst consisting of iodine and a porous support. Other objects will become apparent from the detailed description of the invention.

Briefly the process of the invention produces isoparaffins from corresponding normal paraffins by contacting the normal paraffin feedstocks in the vapor state at an elevated temperature above about 600° F. with a solid catalyst consisting of between about 5% and 40% by weight of iodine on a solid porous support.

The process is applicable to the isomerization of vaporizable normal paraffin hydrocarbons either in the form of a single compound or mixture of compounds. The process is of particular utility in the isomerization of the normal paraffins containing from 4 to 8 carbon atoms such as n-butane, n-pentane, n-hexane and n-octane. The process is applicable to isomerization of paraffins which contain a small amount of branching, particularly heptanes and octanes and higher molecular weight paraffins. Pentane and hexane are a preferred feedstock to the process.

The catalyst utilized in the process consists of iodine and a solid porous support. The elemental iodine is admixed with the solid porous support to obtain a solid catalyst containing between about 5% and 40% by weight of the iodine; the preferred content of iodine is between about 10% and 25%.

The solid porous support may be a material which is in itself active to some extent for isomerization or may be inert for isomerization. Examples of suitable porous supports are carbon, activated charcoal, alumina—particularly gel alumina—bauxite, silica gel, silica alumina, silica magnesia, kieselguhr—either the natural or acid treated variety—etc. Gel alumina and silica gel are preferred supports. When a support such as alumina is used it is preferred that it be substantially dehydrated by having been treated to calcination temperatures prior to preparation of the catalyst.

The solid catalyst of the process is readily made by mixing powdered elemental iodine and the solid porous support in particulate form; the mixture may be heated to reaction temperature for a time prior to use or may be put into use immediately. The iodine apparently becomes affixed to the solid porous support because it is not readily leached from the support by liquid hydrocarbons. Some iodine does pass off with the product hydrocarbon vapor as evidenced by discoloration of the product hydrocarbon. However, iodine-support is very stable and significant losses of iodine do not occur by sublimation until the catalyst is heated to temperatures in excess of 1000° F.

The process is carried out with the paraffin feedstock in the vapor state and the contacting of the vapors and the solid catalyst is at an elevated temperature above about 600° F. In general, the reaction zone is maintained at temperatures below 1000° F. When operating with feedstocks such as pentane and hexane it is preferred to operate with temperatures between about 700° F. and 800° F.

The contacting time is determined by the combination of isomerization desired and cracking reaction. When operating with the lower molecular weight normal paraffins operation at temperatures between about 700° F. and 800° F. produces maximum isomerization with a relatively small loss of feedstock to cracking reactions.

TESTS

The illustrative operations set out hereinbelow were carried out in a 250 ml. reactor provided with a stirrer. The reactor was charged with the desired amount of iodine and a desired amount of solid porous support and was then sealed. Air was withdrawn from the reactor by means of vacuum and the normal paraffin then charged into the reactor. The contents of the reactor were brought to the desired temperature and agitated for the desired reaction time. At the end of the time the vessel was cooled so that hydrocarbon products could be distilled out of the vessel; the total distillate was condensed at Dry-Ice temperature. Dissolved iodine was removed from the hydrocarbon liquid by washing with aqueous sodium thiosulfate. The composition of the hydrocarbon liquid was determined by gas chromatography.

*Test I*

In this test the catalyst consisted of 2.5 g. of iodine and 15 g. of gel alumina which alumina had been calcined previously at 1000° F. 50 g. of n-pentane were charged. The reaction was carried out at 700° F. for 6 hours. The pentane boiling range material produced contained 19% isopentane.

*Test II*

In this test the catalyst consisted only of 15 g. of gel alumina. 50 g. of n-pentane were charged to the reactor. The reactor was maintained at 700° F. for 6 hours. The pentane product contained less than 1% of isopentane.

*Test III*

In this test only 2.5 g. of iodine and 50 g. of n-pentane were charged. The reactor was maintained at 600° F. for 16 hours. The pentane product fraction contained less than 1% of isopentane.

*Test IV*

In this test 5 g. of iodine and 20 g. gel alumina and 60 ml. of n-hexane were contacted at 700° F. for 24 hours. 67% of the n-hexane was converted; of the material converted 81% consisted of branched hexanes (isohexanes) and 19% consisted of products lower in molecular weight than hexane.

*Test V*

In this test 5 g. of iodine, 20 g. of gel alumina and 60 ml. of n-pentane were contacted at 750–800° F. for 24 hours. 67% of the n-pentane charged was converted to other materials; of the material converted 38% was recovered as isopentane and 62% was material lower boiling than pentane.

Test VI

In this test 5 g. of iodine, 20 g. gel alumina and 60 ml. of n-pentane were contacted for 24 hours at 600° F. 66% of the n-pentane was converted; of the reaction product 85% was recovered as isopentane and 15% was a material lower boiling than pentane.

Test VII

In this test 5 g. of iodine, 20 g. of silica gel and 60 ml. of n-pentane were contacted 24 hours at 750-800° F. 56% of the n-pentane feedstock was converted; of the conversion product 81% was isopentane and 19% lower boiling than pentane.

Test VIII

In this test 20 g. of gel alumina (no iodine was present) and 60 ml. of n-pentane were contacted for 24 hours at 600° F. Under these conditions no conversion of n-pentane was observed.

Thus having described the invention what is claimed is:

1. A process for the catalytic production of isoparaffins from the corresponding normal paraffins in which the normal paraffin feedstock is contacted in the vapor state at an elevated temperature above about 600° F. with a solid catalyst consisting of between about 5% and 40% by weight of elemental iodine and a solid porous support.

2. The process of claim 1 wherein said support is gel alumina.

3. The process of claim 1 wherein said support is silica gel.

4. The process of claim 1 wherein said temperature is between about 700° F. and 800° F.

5. The process of claim 1 wherein said normal paraffin is pentane.

6. The process of claim 1 wherein said normal paraffin is hexane.

7. The process of claim 1 wherein said catalyst consists of between 10% and 25% of elemental iodine and the remainder gel alumina.

8. A process for the catalytic production of isoparaffins from a normal paraffin feedstock selected from the class consisting of butane, pentane, hexane and mixtures thereof, in which the normal paraffin is contacted in the vapor state, at a temperature between about 700° F. and 800° F., with a solid catalyst consisting of between about 10% and 25% by weight of elemental iodine and the remainder a porous support selected from the class consisting of alumina and silica gel.

References Cited in the file of this patent

UNITED STATES PATENTS 2,361,755     Fawcett _____ Oct. 31, 1944